US008814040B2

(12) United States Patent
Obi et al.

(10) Patent No.: US 8,814,040 B2
(45) Date of Patent: Aug. 26, 2014

(54) AUTOMATIC DEALING MACHINE AND AUTOMATIC DEALING SYSTEM

(75) Inventors: Tomoyuki Obi, Kawasaki (JP); Hajime Morino, Kasakabe (JP)

(73) Assignee: Glory Ltd., Himeji-Shi, Hyogo-Ken (JP)

( * ) Notice: Subject to any disclaimer, the term of this patent is extended or adjusted under 35 U.S.C. 154(b) by 0 days.

(21) Appl. No.: 13/488,629

(22) Filed: Jun. 5, 2012

(65) Prior Publication Data

US 2012/0241282 A1     Sep. 27, 2012

Related U.S. Application Data

(63) Continuation of application No. 12/221,491, filed on Aug. 4, 2008, now abandoned.

(51) Int. Cl.
| | | |
|---|---|---|
| *G07F 19/00* | (2006.01) | |
| *G06Q 40/00* | (2012.01) | |
| *G06F 19/00* | (2011.01) | |

(52) U.S. Cl.
USPC .................. 235/379; 463/25; 463/29; 705/35

(58) Field of Classification Search
USPC .................. 235/379, 384; 463/25, 29, 39, 43; 705/16
See application file for complete search history.

(56) References Cited

U.S. PATENT DOCUMENTS

| 6,260,757 | B1 * | 7/2001 | Strisower ..................... 235/379 |
|---|---|---|---|
| 6,520,408 | B1 * | 2/2003 | Force et al. .................... 235/379 |
| 7,610,215 | B1 * | 10/2009 | Folk et al. ...................... 705/16 |
| 7,789,295 | B2 * | 9/2010 | Smith et al. ................... 235/379 |
| 8,489,476 | B1 * | 7/2013 | Lester et al. ..................... 705/35 |
| 2003/0013521 | A1 * | 1/2003 | Cole et al. ........................ 463/29 |
| 2003/0104865 | A1 * | 6/2003 | Itkis et al. ....................... 463/39 |
| 2003/0168508 | A1 * | 9/2003 | Daellenbach et al. ........ 235/379 |
| 2004/0192431 | A1 * | 9/2004 | Singer et al. .................... 463/20 |
| 2004/0204233 | A1 * | 10/2004 | Saffari et al. ................... 463/25 |
| 2005/0107155 | A1 * | 5/2005 | Potts et al. ...................... 463/25 |
| 2005/0204344 | A1 * | 9/2005 | Shinomi ....................... 717/124 |
| 2005/0282627 | A1 * | 12/2005 | Hedrick et al. ................. 463/25 |
| 2006/0068898 | A1 * | 3/2006 | Maya .............................. 463/25 |
| 2006/0154722 | A1 * | 7/2006 | Walker et al. .................. 463/25 |
| 2006/0194633 | A1 * | 8/2006 | Paulsen .......................... 463/43 |
| 2007/0167220 | A1 * | 7/2007 | Fujimoto et al. ............... 463/25 |
| 2008/0026822 | A1 * | 1/2008 | Walker et al. .................. 463/25 |
| 2008/0083194 | A1 * | 4/2008 | Kasahara et al. ................ 53/52 |
| 2008/0277468 | A1 * | 11/2008 | Mitschele ..................... 235/384 |
| 2009/0014946 | A1 * | 1/2009 | Nagura et al. ................. 271/220 |
| 2009/0017888 | A1 * | 1/2009 | Kuhn et al. ..................... 463/13 |
| 2009/0111556 | A1 * | 4/2009 | Moody ........................... 463/20 |
| 2009/0305765 | A1 * | 12/2009 | Walker et al. .................. 463/20 |

* cited by examiner

*Primary Examiner* — Dmitry Suhol
*Assistant Examiner* — Jason Yen
(74) *Attorney, Agent, or Firm* — Renner, Kenner, Greive, Bobak, Taylor & Weber

(57) ABSTRACT

An automatic dealing machine comprises a casing configured for storing a chip handling unit for handling chips, and a banknote handling unit for handling banknotes. The chip handling unit includes a chip insertion port through which chips are received from the exterior of the casing, a chip determination portion for determining the kind of each chip, and a chip calculation portion for calculating the number of the chips, of each kind, as determined by the chip determination portion and the total amount of money. A control unit controls the operation of the dealing machine, such that banknotes of an amount of money corresponding to the total amount of the chips calculated by the chip calculation portion are disbursed into the banknote disbursement port when the chips are inserted through the chip insertion port.

6 Claims, 6 Drawing Sheets

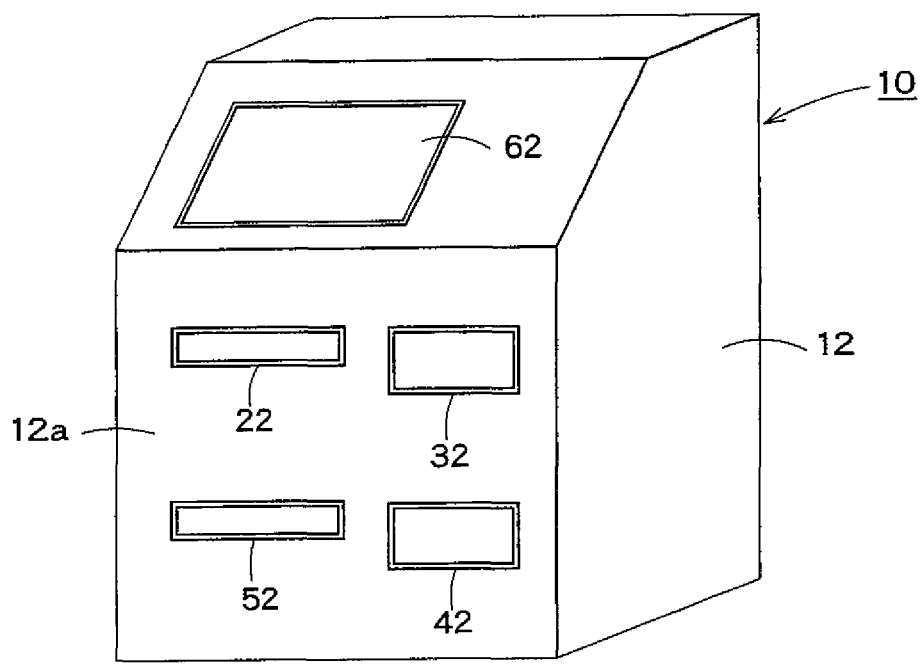
F I G. 1

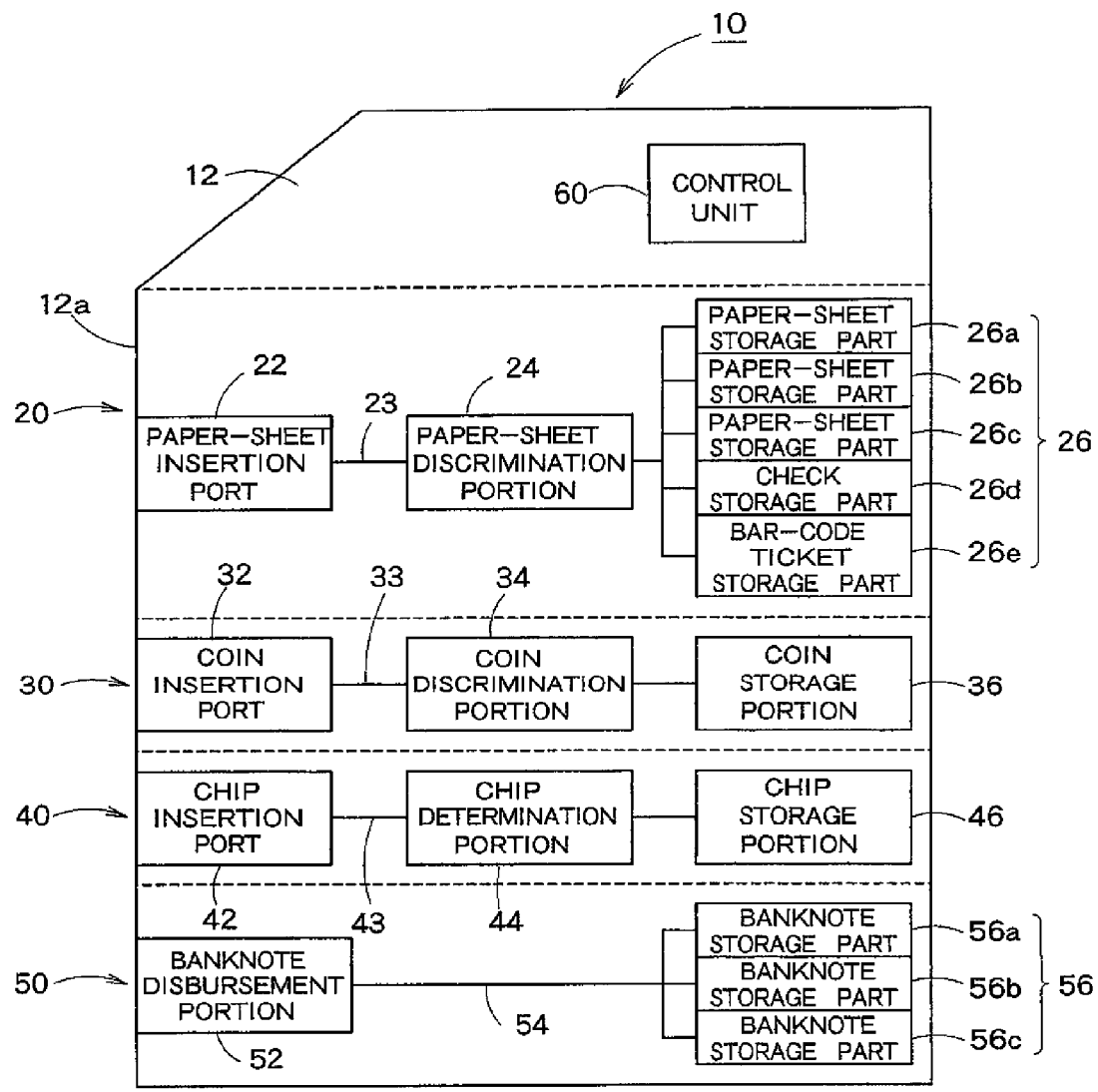
F I G. 2

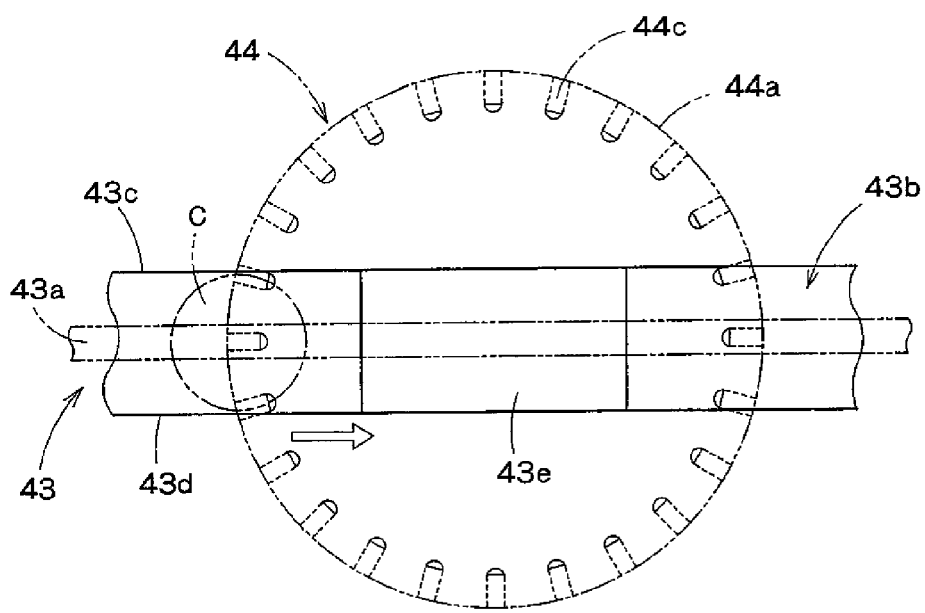
F I G. 4
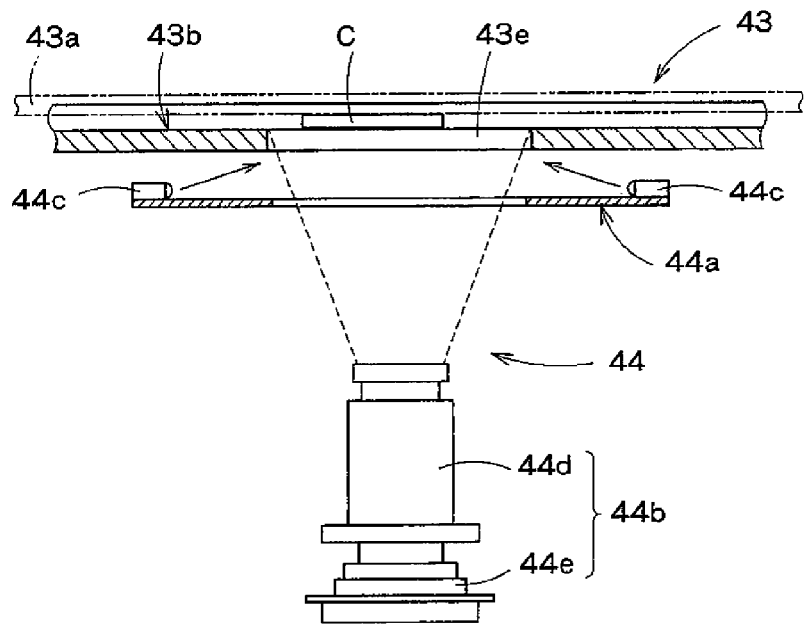
F I G. 5

AUTOMATIC DEALING MACHINE AND AUTOMATIC DEALING SYSTEM

CROSS-REFERENCE TO RELATED APPLICATION

This application is a continuation of U.S. patent application Ser. No. 12/221,491 filed Aug. 4, 2008 now abandoned.

FIELD OF THE INVENTION

The present invention relates to an automatic dealing machine which is installed in a gaming facility and operated by a customer, as well as relates to an automatic dealing system provided with the automatic dealing machine.

BACKGROUND ART

In the gaming facility, cash (such as banknotes, coins, etc.), bar-code tickets, on each of which bar-code information (e.g., a bar-code corresponding to a certain eighteen-digit number) is attached, checks, chips and the like, are used as media each having a value of a currency. In some cases, for example, the bar-code ticket or check is paid in place of the cash, such as banknotes, coins and the like, from an amusement machine, such as a slot machine and the like. Otherwise, chips are sometimes used in place of the cash, such as banknotes, coins and the like, in a table game, such as roulette, poker and the like. In regard to such media each having the value of a currency, exchange and/or cashing between different kinds of media, is carried out in the gaming facility. For the bar-code tickets and/or checks, an image is obtained by a cashier or the like person in the gaming facility.

In JP7-505079T, a certain slot machine configured to be installed in the gaming facility is disclosed. In this slot machine, coins are not used. Instead, this slot machine is configured to receive banknotes, coupons printed in advance and/or bar-code tickets, and then work, corresponding to an amount of money of the received banknotes or the like. This slot machine includes a printer adapted for printing the bar-code tickets, to each of which a bar code corresponding to the amount of money of a prize is attached, and is configured to disburse such bar-code tickets respectively printed by the printer.

In US2006/0195567A1, a cash disbursement machine having a gaming facility handling kiosk is disclosed.

SUMMARY OF THE INVENTION

In a conventional gaming facility, each handling for the exchange and/or cashing of the cash, bar-code tickets, checks, chips and the like and/or obtainment of an image of each bar-code ticket and/or check was carried out by an individual handling machine. However, because each handling machine was configured to handle such media for each kind thereof, there was a need for providing respective deposit and disbursement portions, for the cash, bar-code tickets, checks, chips and the like, to each handling machine. Additionally, when attempting to perform one handling after another, a separate machine must be prepared for each handling, thus requiring much time and labor. Furthermore, the conventional handling machine cannot perform automatic discrimination for the chips used in the table game. Therefore, each cashier in the gaming facility must determine the kind of chips by hand.

The present invention was made in light of such circumstances. Therefore, it is an object to provide a new automatic dealing machine and a new automatic dealing system provided with this automatic dealing machine, which can automatically determine each chip inserted through a chip insertion port of a chip handling unit, thus eliminating the time and labor required for determining the chip by hand, and which can automatically disburse banknotes of an amount of money corresponding to the total amount of money of the determined chips, into a banknote disbursement port of a banknote handling unit.

Another object of this invention is to perform all or part of handling, including exchange and/or cashing for the cash, such as banknotes and/or coins, bar-code tickets, checks, chips and the like, obtainment of an image of each bar-code ticket and/or check and deposit and/or disbursement of money relative to a bank, by using a single automatic dealing machine.

The automatic dealing machine according to the present invention is configured to be installed in a gaming facility and operated by a customer, the automatic dealing machine comprising: a casing configured for storing therein a plurality of handling units; a chip handling unit located in the casing and adapted for handling chips, the chip handling unit including a chip insertion port through which the chips can be inserted into the chip handling unit from the exterior of the casing, a chip determination portion adapted for determining the kind of each chip inserted through the chip insertion port, a chip calculation portion adapted for calculating the number of the chips, for each kind, determined by the chip determination portion and total amount of money of the chips, and a chip storage portion configured for storing therein the chips determined by the chip determination portion; a banknote handling unit located in the casing and adapted for handling banknotes, the banknote handling unit including a banknote disbursement port configured for releasing the banknotes such that they can be taken out to the exterior of the casing, a banknote storage portion configured for storing the banknotes therein, and a banknote disbursement portion adapted for disbursing necessary sheets of banknotes into the banknote disbursement port from the banknote storage portion; and a control unit adapted for controlling the chip handling unit and banknote handling unit, wherein the control unit performs control such that the banknotes of an amount of money corresponding to the total amount of money of the chips calculated by the chip calculation portion of the chip handling unit can be disbursed into the banknote disbursement port of the banknote handling unit, when the chips are inserted through the chip insertion port of the chip handling unit.

According to this automatic dealing machine, determination of each chip inserted through the chip insertion port of the chip handling unit can be automatically performed. Therefore, the time and labor required for determining each chip by hand can be eliminated. Besides, the banknotes of the amount of money corresponding to the total amount of money of the determined chips can be automatically disbursed into the banknote disbursement port of the banknote handling unit.

In the automatic dealing machine of this invention, it is preferred that the chip determination portion is configured to take an image of a surface of each chip and determine the chip, based on the taken image. In this case, it is preferred that the chip determination portion is configured to determine the chip, based on a color and/or design of the taken image. Alternatively, the chip determination portion may be configured to determine the chip, based on information about the interior of the chip, more specifically on an IC tag and/or a certain material provided in the chip.

Preferably, the automatic dealing machine of this invention further comprises a coin handling unit provided in the casing and adapted for handling coins, the coin handling unit including a coin insertion port through which the coins can be inserted into the coin handling unit from the exterior of the casing, a coin discrimination portion adapted for discriminating the coins inserted through the coin insertion port, and a coin storage portion configured for storing therein the coins discriminated by the coin discrimination portion.

In this case, it is preferred that the control unit is also configured to control the coin handling unit, wherein the control unit performs control such that the banknotes of an amount of money corresponding to the total amount of money of the coins in a result of discrimination by the coin discrimination portion of the coin handling unit can be disbursed into the banknote disbursement port of the banknote handling unit, when the coins are inserted through the coin insertion port of the coin handling unit.

Preferably, the automatic dealing machine of this invention further comprises a paper-sheet handling unit provided in the casing and adapted for handling paper-sheets, the paper-sheet handling unit including a paper-sheet insertion port through which the paper-sheets can be inserted into the paper-sheet handling unit from the exterior of the casing, a paper-sheet discrimination portion adapted for discriminating the paper-sheets inserted through the paper-sheet insertion port, and a paper-sheet storage portion configured for storing therein the paper-sheets discriminated by the paper-sheet discrimination portion.

In this case, the paper-sheets may include banknotes, bar-code tickets or checks, wherein the paper-sheet storage portion has at least one of a banknote storage part for storing the banknotes therein, a bar-code ticket storage part for storing the bar-code tickets therein and a check storage part for storing the checks therein, and wherein, in the case in which the paper-sheets are discriminated as banknotes by the paper-sheet discrimination portion, such banknotes are stored in the banknote storage part, or in the case in which the paper-sheets are discriminated as bar-code tickets by the paper-sheet discrimination portion, such bar-code tickets are stored in the bar-code ticket storage part, or in the case in which the paper-sheets are discriminated as checks by the paper-sheet discrimination portion, such checks are stored in the check storage part.

It is preferred that the paper-sheet discrimination portion is configured to obtain an image of each bar-code ticket when the paper-sheet discrimination portion discriminates the paper-sheets as bar-code tickets.

It is preferred that the paper-sheet discrimination portion is configured to obtain an image of each check when the paper-sheet discrimination portion discriminates the paper-sheets as checks.

It is preferred that the control unit is also configured to control the paper-sheet handling unit, wherein the control unit performs control such that the banknotes of the amount of money corresponding to the total amount of money of the inserted banknotes in a result of discrimination by the paper-sheet discrimination portion of the paper-sheet handling unit, while different in the denomination, can be disbursed to the banknote disbursement port of the banknote handling unit, when the banknotes are inserted through the paper-sheet insertion port of the paper-sheet handling unit.

It is preferred that the automatic dealing machine of this invention further comprises a coin handling unit provided in the casing and adapted for handling coins, the coin handling unit including a coin insertion port through which the coins can be inserted into the coin handling unit from the exterior of the casing, a coin discrimination portion adapted for discriminating the coins inserted through the coin insertion port, and a coin storage portion configured for storing therein the coins discriminated by the coin discrimination portion; and a paper-sheet handling unit provided in the casing and adapted for handling paper-sheets, the paper-sheet handling unit including a paper-sheet insertion port through which the paper-sheets can be inserted into the paper-sheet handling unit from the exterior of the casing, a paper-sheet discrimination portion adapted for discriminating the paper-sheets inserted through the paper-sheet insertion port, and a paper-sheet storage portion configured for storing therein the paper-sheets discriminated by the paper-sheet discrimination portion, wherein the control unit is also configured to control the coin handling unit and paper-sheet handling unit, wherein the control unit performs control such that the banknotes of an amount of money corresponding to the total amount of money of the inserted coins in a result of discrimination by the coin discrimination portion of the coin handling unit can be disbursed into the banknote disbursement port of the banknote handling unit, when the coins are inserted through the coin insertion port of the coin handling unit, and wherein the control unit performs control such that the banknotes of the amount of money corresponding to the total amount of money of the inserted banknotes in a result of discrimination by the paper-sheet discrimination portion of the paper-sheet handling unit, while different in the denomination, can be disbursed to the banknote disbursement port of the banknote handling unit, when the banknotes are inserted through the paper-sheet insertion port of the paper-sheet handling unit.

In the automatic dealing machine of this invention, it is preferred that the control unit disburses coins, as the remaining amount of money left undisbursed upon the disbursement in accordance with a designation of a customer, or as an amount of money that cannot be disbursed with banknotes. It is preferred that the control unit drives a storage memory, which can be controlled by a customer, to store therein the remaining amount of money left undisbursed upon the disbursement in accordance with a designation of the customer or amount of money that cannot be disbursed with banknotes.

The automatic dealing system according to the present invention includes an automatic dealing machine installed in a gaming facility and configured to be operated by a customer and a host machine communicatively connected with the automatic dealing machine, wherein the automatic dealing machine comprises: a casing configured for storing therein a plurality of handling units; a chip handling unit located in the casing and adapted for handling chips, the chip handling unit including a chip insertion port through which the chips can be inserted into the chip handling unit from the exterior of the casing, a chip determination portion adapted for determining the kind of each chip inserted through the chip insertion port, a chip calculation portion adapted for calculating the number of the chips, for each kind, determined by the chip determination portion and total amount of money of the chips, and a chip storage portion configured for storing therein the chips determined by the chip determination portion; a banknote handling unit located in the casing and adapted for handling banknotes, the banknote handling unit including a banknote disbursement port configured for releasing the banknotes such that they can be taken out to the exterior of the casing, a banknote storage portion configured for storing the banknotes therein, and a banknote disbursement portion adapted for disbursing necessary sheets of banknotes into the banknote disbursement port from the banknote storage portion; and a control unit adapted for controlling the chip handling unit and banknote handling unit, wherein the control unit performs control such that the banknotes of an amount of money corresponding to the total amount of money of the chips calculated by the chip calculation portion of the chip handling unit can be disbursed into the banknote disbursement port of the banknote handling unit, when the chips are inserted through the chip insertion port of the chip handling unit.

According to this automatic dealing system, determination of each chip inserted through the chip insertion port in the chip handling unit of the automatic dealing machine can be automatically performed. Therefore, the time and labor required for determining each chip by hand can be eliminated. Additionally, the banknotes of the amount of money corresponding to the total amount of money of the determined chips can be automatically disbursed into the banknote disbursement port of the banknote handling unit of the automatic dealing machine.

In the automatic dealing system of this invention, it is preferred that the host machine includes a host controller, wherein the host controller is communicatively connected with the automatic dealing machine.

In the automatic dealing system of this invention, it is preferred that the automatic dealing machine further comprises a paper-sheet handling unit provided in the casing and adapted for handling paper-sheets including banknotes, barcode tickets or checks, the paper-sheet handling unit including a paper-sheet insertion port through which the paper-sheets can be inserted into the paper-sheet handling unit from the exterior of the casing, a paper-sheet discrimination portion adapted for discriminating the paper-sheets inserted through the paper-sheet insertion port, and a paper-sheet storage portion configured for storing therein the paper-sheets discriminated by the paper-sheet discrimination portion, wherein the control unit of the automatic dealing machine is also configured to control the paper-sheet handling unit, such that the control unit drives the paper-sheet discrimination portion of the paper-sheet handling unit to read bar-code information of each bar-code ticket when the bar-code tickets are inserted through the paper-sheet insertion port of the paper-sheet handling unit, performs a check over the read information by communicating with the host machine, and then drives the paper-sheet storage portion to store the bar-code tickets therein when the check is normally performed, as well as disburses the banknotes of an amount of money, based on the read information about the bar code, into the banknote disbursement port of the banknote handling unit.

In the automatic dealing system of this invention, it is preferred that the automatic dealing machine further comprises a paper-sheet handling unit provided in the casing and adapted for handling paper-sheets including banknotes, barcode tickets or checks, the paper-sheet handling unit including a paper-sheet insertion port through which the paper-sheets can be inserted into the paper-sheet handling unit from the exterior of the casing, a paper-sheet discrimination portion adapted for discriminating the paper-sheets inserted through the paper-sheet insertion port, and a paper-sheet storage portion configured for storing therein the paper-sheets discriminated by the paper-sheet discrimination portion, wherein the control unit of the automatic dealing machine is also configured to control the paper-sheet handling unit, such that the control unit drives the paper-sheet discrimination portion of the paper-sheet handling unit to read data of the checks when the checks are inserted through the paper-sheet insertion port of the paper-sheet handling unit, performs a check over the read information by communicating with the host machine, and then drives the paper-sheet storage portion to store the checks therein when the check is normally performed, as well as disburses the banknotes of an amount of money, based on the read information about the data of the checks, into the banknote disbursement port of the banknote handling unit.

In the automatic dealing system of this invention, it is preferred that the automatic dealing machine further comprises an operation portion which can be controlled by a customer, wherein when a command for disbursing money on deposit is given by the customer via the operation portion and then the control unit receives the command for disbursing the money on deposit from the host machine by communicating with the host machine, the control unit of the automatic dealing machine disburses the banknotes of an amount of money corresponding to the command, into the banknote disbursement port of the banknote handling unit.

In the automatic dealing system of this invention, it is preferred that the automatic dealing machine further comprises a paper-sheet handling unit provided in the casing and adapted for handling paper-sheets including banknotes, barcode tickets or checks, the paper-sheet handling unit including a paper-sheet insertion port through which the paper-sheets can be inserted into the paper-sheet handling unit from the exterior of the casing, a paper-sheet discrimination portion adapted for discriminating the paper-sheets inserted through the paper-sheet insertion port, and a paper-sheet storage portion configured for storing therein the paper-sheets discriminated by the paper-sheet discrimination portion, wherein the control unit of the automatic dealing machine is also configured to control the paper-sheet handling unit, such that the control unit drives the paper-sheet discrimination portion of the paper-sheet handling unit to discriminate the banknotes inserted into the casing, when the banknotes are inserted through the banknote insertion port of the banknote handling unit, and then transmits information about an amount of deposited money of such discriminated banknotes to the host machine.

In the automatic dealing system of this invention, it is preferred that the automatic dealing machine further comprises a coin handling unit provided in the casing and adapted for handling coins, the coin handling unit including a coin insertion port through which the coins can be inserted into the coin handling unit from the exterior of the casing, a coin discrimination portion adapted for discriminating the coins inserted through the coin insertion port, and a coin storage portion configured for storing therein the coins discriminated by the coin discrimination portion, wherein the control unit of the automatic dealing machine is also configured to control the coin handling unit, such that the control unit drives the coin discrimination portion of the coin handling unit to discriminate the coins inserted into the casing, when the coins are inserted through the coin insertion port of the coin handling unit, and then transmits information about an amount of deposited money of such discriminated coins to the host machine.

In the automatic dealing system of this invention, it is preferred that the automatic dealing machine further comprises: a coin handling unit provided in the casing and adapted for handling coins, the coin handling unit including a coin insertion port through which the coins can be inserted into the coin handling unit from the exterior of the casing, a coin discrimination portion adapted for discriminating the coins inserted through the coin insertion port, and a coin storage portion configured for storing therein the coins discriminated by the coin discrimination portion; and a paper-sheet handling unit provided in the casing and adapted for handling paper-sheets, the paper-sheet handling unit including a paper-sheet insertion port through which the paper-sheets can be inserted into the paper-sheet handling unit from the exterior of the casing, a paper-sheet discrimination portion adapted for discriminating the paper-sheets inserted through the paper-sheet insertion port, and a paper-sheet storage portion configured for storing therein the paper-sheets discriminated by the paper-sheet discrimination portion, wherein the control unit of the automatic dealing machine is also configured to control the coin handling unit and paper-sheet handling unit, wherein the control unit performs control such that the banknotes of an amount of money corresponding to the total amount of money of the coins in a result of discrimination by the coin discrimination portion of the coin handling unit can be disbursed into the banknote disbursement port of the banknote handling unit, when the coins are inserted through the coin insertion port of the coin handling unit, and wherein the control unit performs control such that the banknotes of the amount of money corresponding to the total amount of money of the inserted banknotes in a result of discrimination by the paper-sheet discrimination portion of the paper-sheet handling unit, while different in the denomination, can be disbursed to the banknote disbursement port of the banknote handling unit, when the banknotes are inserted through the paper-sheet insertion port of the paper-sheet handling unit.

BRIEF DESCRIPTION OF THE DRAWINGS

FIG. 1 is a perspective view showing external appearance of the automatic dealing machine in one embodiment of the present invention.

FIG. 2 is a configuration diagram showing schematic construction of the automatic dealing machine shown in FIG. 1, in which construction of each handling unit stored in the casing is illustrated.

FIG. 4 is a plan view showing details of construction of the chip determination portion of the automatic dealing machine illustrated in FIG. 2.

FIG. 5 is a side view of the chip determination portion shown in FIG. 4.

DETAILED DESCRIPTION OF THE INVENTION

Figure 3:
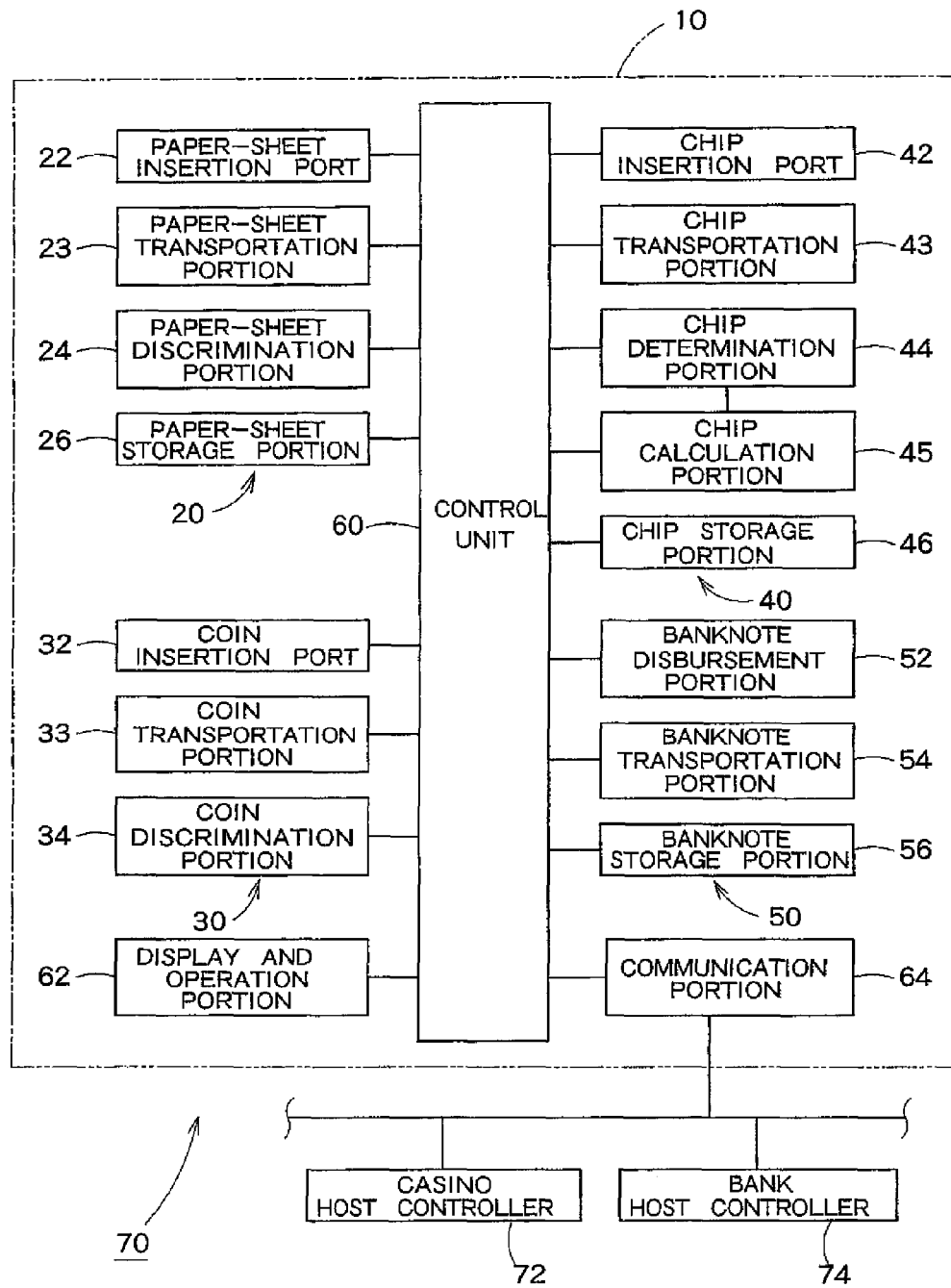
FIG. 3 is a control block diagram of the automatic dealing system provided with the automatic dealing machine shown in FIG. 1.

Hereinafter, one embodiment of the present invention will be described with reference to the drawings. FIGS. 1 through 5 are diagrams respectively showing the automatic dealing machine related to one embodiment of this invention. Of these drawings, FIG. 1 is a perspective view showing external appearance of the automatic dealing machine in this embodiment of the present invention. FIG. 2 is a configuration diagram showing schematic construction of the automatic dealing machine shown in FIG. 1, in which construction of each handling unit stored in the casing is illustrated, and FIG. 3 is a control block diagram of the automatic dealing system provided with the automatic dealing machine shown in FIG. 1. FIG. 4 is a plan view showing details of construction of the chip determination portion of the automatic dealing machine illustrated in FIG. 2, and FIG. 5 is a side view of the chip determination portion shown in FIG. 4. Generally, the automatic dealing machine according to this embodiment is installed in a gaming facility and is provided to be operated by a customer for himself or herself.

As shown in FIG. 1, an automatic dealing machine 10 according to this embodiment includes a casing 12 having a substantially rectangular parallelepiped shape. In the casing 12, a paper-sheet handling unit 20, a coin handling unit 30, a chip handling unit 40 and a banknote handling unit 50 are stored, respectively. It is noted that the detailed construction of each unit 20, 30, 40, 50 will be detailed later. In addition, as shown in FIGS. 2 and 3, the automatic dealing machine 10 further includes a control unit 60. The control unit 60 is configured to control the paper-sheet handling unit 20, coin handling unit 30, chip handling unit 40 and banknote handling unit 50, respectively. With this control unit 60, cashing of bar-code tickets, obtainment of an image of each bar-code ticket, cashing of checks, obtainment of an image of each check, cashing of chips, exchange of cash, deposit and disbursement of money relative to a bank can be performed, respectively. Such handling will be detailed later.

The paper-sheet handling unit 20 is configured to perform insertion of the paper sheets, such as the banknotes, bar-code tickets or checks, into the casing 12. The paper-sheet handling unit 20 includes a banknote insertion port 22, through which the paper-sheets can be inserted into the paper-sheet handling unit 20 from the exterior of the casing 12, a paper-sheet transportation portion 23 adapted for transporting the paper-sheets, one by one, after they are put in the paper-sheet insertion port 22 and then fed into the paper-sheet handling unit 20 through the paper-sheet insertion port 22, and a paper-sheet discrimination portion 24 provided in the paper-sheet transportation portion 23 and adapted for discriminating the paper-sheets transported by the paper-sheet transportation portion 23. In addition, a paper-sheet storage portion 26 is provided in the paper-sheet handling unit 20, such that the paper-sheets will be fed into this paper-sheet storage portion 26 after they are transported by the paper-sheet transportation portion 23 and then discriminated by the paper-sheet discrimination portion 24.

The paper-sheet insertion port 22 is provided in a front face 12a of the casing 12 of the automatic dealing machine 10, such that a customer can insert one or more paper-sheets, by hand, into the paper-sheet insertion port 22. In the paper-sheet insertion port 22, a paper-sheet feed-out mechanism (not shown) is provided for feeding out the paper-sheets to the paper-sheet transportation portion 23, one by one, after they are inserted through the paper-sheet insertion port 22. For instance, this paper-sheet feed-out mechanism is composed of several rollers. The paper-sheet transportation portion 23 is configured to transport the paper-sheets, one by one, after they are fed out by the paper-sheet feed-out mechanism provided in the paper-sheet insertion port 22. During this transportation, the paper-sheets can be discriminated by the paper-sheet discrimination portion 24. Namely, the paper-sheet discrimination portion 24 is configured to discriminate each paper-sheet. More specifically, in the case in which the discriminated paper-sheets are banknotes, the paper-sheet discrimination portion 24 discriminate the denomination, fitness, authenticity and the like of each banknote. Meanwhile, in the case in which the discriminated paper-sheets are bar-code tickets, the paper-sheet discrimination portion 24 reads bar-code information (e.g., an eighteen-digit number) of each bar-code ticket while obtaining an image of the bar-code ticket. Otherwise, in the case in which the discriminated paper-sheets are checks, the paper-sheet discrimination portion 24 reads data of each check while obtaining an image of the check.

Discrimination information on each paper-sheet obtained by the paper-sheet discrimination portion 24 will be sent to the control unit 60 which will be described later. More specifically, information on the number of sheets of one or more the banknotes, for each denomination, discriminated by the paper-sheet discrimination portion 24 and/or total amount of money, bar-code information and images of the bar-code tickets obtained by the paper-sheet discrimination portion 24, and data and images of the checks obtained by the paper-sheet discrimination portion 24 will be sent to the control unit 60 from the paper-sheet discrimination portion 24, respectively.

As shown in FIG. 2, the paper-sheet storage portion 26 is composed of a plurality of (e.g., three) paper-sheet storage parts 26a, 26b, 26c, a check storage part 26d, and a bar-code ticket storage part 26e. When the paper-sheets are discriminated as banknotes by the paper-sheet discrimination portion 24, such paper-sheets will be stored in the paper-sheet storage parts 26a, 26b, 26c, for each denomination. Meanwhile, when the paper-sheets are discriminated as checks by the paper-sheet discrimination portion 24, such checks will be stored in the check storage part 26d. Otherwise, when the paper-sheets are discriminated as bar-code tickets by the paper-sheet discrimination portion 24, such bar-code tickets will be stored in the bar-code ticket storage part 26e.

The coin handling unit 30 is configured to perform insertion of the coins into the casing 12. The coin handling unit 30 includes a coin insertion port 32, through which the coins can be inserted into the coin handling unit 30 from the exterior of the casing 12, a coin transportation portion 33 adapted for transporting the coins, one by one, after they are put in the coin insertion port 32 and then fed into the coin handling unit 30 through the coin insertion port 32, and a coin discrimination portion 34 provided in the coin transportation portion 33 and adapted for discriminating the coins transported by the coin transportation portion 33. In addition, a coin storage portion 36 is provided in the coin handling unit 30, such that the coins will be fed into this coin storage portion 36 after they are transported by the coin transportation portion 33 and then discriminated by the coin discrimination portion 34.

The coin insertion port 32 is provided in the front face 12a of the casing 12 of the automatic dealing machine 10, such that a customer can put one or more coins, by hand, in the coin insertion port 32. In the coin insertion port 32, a coin feed-out mechanism (not shown) is provided for feeding out the coins to the coin transportation portion 33, one by one, after they are inserted through the coin insertion port 32. The coin transportation portion 33 is configured to transport the coins, one by one, after they are fed out by the coin feed-out mechanism provided in the coin insertion port 32. During this transportation, the coins can be discriminated by the coin discrimination portion 34. Namely, the coin discrimination portion 34 is configured to discriminate the denomination, fitness, authenticity and the like of each coin.

Discrimination information on each coin obtained by the coin discrimination portion 34 will be sent to the control unit 60 which will be described later. More specifically, information on the number of one or more coins, for each denomination, discriminated by the coin discrimination portion 34 and/or total amount of money will be sent to the control unit 60 from the coin discrimination portion 34, respectively.

The chip handling unit 40 is configured to perform insertion of the chips into the casing 12. The chip handling unit 40 includes a chip insertion port 42, through which the chips can be inserted into the chip handling unit 40 from the exterior of the casing 12, a chip transportation portion 43 adapted for transporting the chips, one by one, after they are put in the chip insertion port 42 and then fed into the chip handling unit 40 through the chip insertion port 42, and a chip determination portion 44 provided in the chip transportation portion 43 and adapted for determining the kind of each chip transported by the chip transportation portion 43. As shown in FIG. 3, a chip calculation portion 45, adapted for calculating the number of the chips, for each kind, determined by the chip determination portion 44 and total amount of money, is connected with the chip determination portion 44. In addition, a chip storage portion 46 is provided in the chip handling unit 40, such that the chips will be fed into the chip storage portion 46 after they are transported by the chip transportation portion 43 and determined in regard to the kind thereof by the chip determination portion 44.

The chip insertion port 42 is provided in the front face 12a of the casing 12 of the automatic dealing machine 10, such that a customer can put one or more chips, by hand, in the chip insertion port 42. In the chip insertion port 42, a chip feed-out mechanism (not shown) is provided for feeding out the chips to the chip transportation portion 43, one by one, after they are inserted through the chip insertion port 42. The chip transportation portion 43 is configured to transport the chips, one by one, after they are fed out by the chip feed-out mechanism provided in the chip insertion port 42. During this transportation, the chips can be determined by the chip determination portion 44.

Next, the construction of the chip determination portion 44 will be detailed with reference to FIGS. 4 and 5. FIG. 4 is a plan view showing details of the construction of the chip determination portion 44, and FIG. 5 is a side view of the chip determination portion 44 shown in FIG. 4.

As shown in FIG. 4, in the chip determination portion 44, a chip C is transported by a transportation belt 43a, in a direction expressed by an arrow depicted in FIG. 4, along a pair of guide rails 43c, 43d, while being pressed against a surface of a chip passage 43b. In a middle portion of the chip passage 43b, a translucent passage part 43e, formed from a translucent material consisting of glass, an acryl resin or the like that is optically transparent, is provided.

As shown in FIG. 5, a light irradiation part 44a is provided below the translucent passage part 43e, such that this irradiation part 44a can irradiate a surface of the chip C passing over the translucent passage part 43e, with light, from below, via the translucent passage part 43e. In addition, an image detection part 44b is provided below the light irradiation part 44a, such that this detection part 44b can detect image data of the chip C by receiving light that is emitted from the light irradiation part 44a and then reflected by the chip C.

The light irradiation part 44a, as shown in FIG. 4, includes a plurality of (e.g., twenty four) emission elements 44c, such as LEDs, arranged at an equal interval on an imaginary circle depicted about a central portion of the translucent passage part 43e. Each emission element 44c is located and oriented, such that it faces a predetermined point on the central axis of the circle depicted about the central portion of the translucent passage part 43e, with its optical axis defining a relatively small angle to the horizontal direction. Thus, each emission element 44c is adapted for emitting light in a relatively small angle to the surface (bottom face) of the chip C passing over the translucent passage part 43e. Namely, the light irradiation part 44a is circularly arranged to surround the entire circumference of the chip C passing over the translucent passage part 43e, in order to irradiate the surface (bottom face) of the chip C, with light, from below, while the chip C passes over the translucent passage part 43e. The central axis of such a circular light irradiation part 44*a* is set to be parallel or coincident with the central axis of the chip C located over the translucent passage part 43*e*.

The image detection part 44*b* includes a lens system part 44*d* located such that an optical axis of this part 44*d* is coincident with the central axis of the circular light irradiation part 44*a* provided around the central portion of the translucent passage part 43*e*. An area sensor 44*e* is provided under the lens system part 44*d*, wherein a focus of this area sensor 44*e* is set at a top face of the translucent passage part 43*e*. In the area sensor 44*e*, a plurality of light-receiving elements, such as CCDs, are arranged in a plane, wherein each light-receiving element is adapted for photoelectrically detecting the light that is emitted from the light irradiation part 44*a* and then reflected by the surface (bottom face) of the chip C. The chip determination portion 44 further includes an A/D converter (not shown) adapted for converting the image data of the chip C optically detected by the area sensor 44*e* into a digital signal so as to produce digitized image data of the chip C.

In the chip determination portion 44 as shown in FIGS. 4 and 5, when the chip C reaches the translucent passage part 43*e* after transported by the transportation belt 43*a* of the chip transportation portion 43, the light emitted from each emission element 44*c* of the light irradiation part 44*a* is reflected by the surface (bottom face) of the chip C. The reflected light is then received by each light receiving element of the area sensor 44*e* of the image detection part 44*b* through the lens system part 44*d*. Thereafter, the image data of the chip C optically detected by the area sensor 44*e* of the image detection part 44*b* is converted into the digital signal. In this way, the digitized image data of the chip C can be produced.

Thus, the chip determination portion 44 determines the kind of each chip C, based on a color (or colors) and/or design of the chip C that can be viewed in the image data produced as described above.

Thereafter, information about the kind of each chip determined by the chip determination portion 44 is sent to the chip calculation portion 45. The chip calculation portion 45 calculates the number of the chips, for each kind, and/or total amount of money, based on the information about the kind of each chip sent from the chip determination portion 44. Then, information figured out by the chip calculation portion 45 is sent to the control unit 60 which will be described later.

The banknote handling unit 50 is configured to perform disbursement of the banknotes stored in the casing 12. The banknote handling unit 50 includes a banknote disbursement port 52 configured for releasing the banknotes such that they can be taken out to the exterior of the casing 12, a banknote storage portion 56 provided in the casing 12 and configured for storing the banknotes therein, and a banknote transportation portion 54 adapted for transporting the banknotes stored in the banknote storage portion 56 to the banknote disbursement port 52. In this case, the banknote transportation portion 54 constitutes a banknote disbursement portion adapted for disbursing necessary sheets of banknotes into the banknote disbursement port 52 from the banknote storage portion 56. This banknote storage portion 56 includes a plurality of (e.g., three) banknote storage parts 56*a*, 56*b*, 56*c*, each configured for storing therein the banknotes for each denomination.

The banknote disbursement port 52 is provided in the front face 12*a* of the casing 12 of the automatic dealing machine 10, such that a customer can take out the banknotes, by hand, after the banknotes are sent to this banknote disbursement port 52 from the banknote transportation portion 54. When a disbursement command is given to the banknote storage portion 56 from the control unit 60 which will be described later, necessary sheets of banknotes will be fed to the banknote transportation portion 54, one by one, from the banknote storage parts 56*a*, 56*b*, 56*c*, respectively, and then the banknotes fed to the banknote transportation portion 54 will be transported into the banknote disbursement port 52.

As shown in FIG. 1, a display and operation portion 62 is provided in the front face 12*a* of the casing 12 of the automatic dealing machine 10. For example, the display and operation portion 62 is composed of a touch panel, and is adapted for displaying contents of handling performed by each handling unit 20, 30, 40, 50, during a normal operation, while adapted for displaying a total amount of money of the media, such as the banknotes or the like, stored in each storage portion 26, 36, 46, 56 in each handling unit 20, 30, 40, 50, during maintenance. With proper operation of this display and operation portion 62, the customer can give various commands to the control unit 60 of the automatic dealing machine 10.

As shown in FIG. 3, the control unit 60 is provided in the automatic dealing machine 10, wherein the control unit 60 is adapted for controlling each component of each handling unit 20, 30, 40, 50. Additionally, the control unit 60 is configured to receive discrimination information sent from the banknote discrimination portion 24 and coin discrimination portion 34 as well as receive each calculation result sent from the chip calculation portion 45.

As shown in FIG. 3, an automatic dealing system 70 is composed of the automatic dealing machine 10 as shown in FIG. 1 and a host machine communicatively connected with the automatic dealing machine 10. For instance, the host machine in the automatic dealing system 70 includes a casino host controller 72, a bank host controller 74 and the like. Additionally, a communication portion 64 composed of an interface is provided to the control unit 60, wherein this communication portion 64 serves to transmit and receive each signal relative to the casino host controller 72 or bank host controller 74. Generally, the casino host controller 72 is installed in a control room of a casino. In the casino host controller 72, information about the bar-code tickets used in the casino as well as information about the amount of money corresponding to each bar-code ticket can be stored. The bank host controller 74 is generally installed in a control room of a bank. In the bank host controller 74, information about a deposit in a bank of each customer, information about checks as well as information about the amount of money corresponding to each check can be stored.

Next, operations of the automatic dealing machine 10 and automatic dealing system 70 including the automatic dealing machine 10, respectively constructed as described above, will be discussed. Each operation of the automatic dealing machine 10, which will be described below, is performed, while the components of each handling unit 20, 30, 40, 50 are respectively controlled by the control unit 60.

<Cashing of the Bar-Code Tickets>

First of all, an operation related to the cashing of the bar-code tickets will be described.

When a customer puts one or more bar-code tickets in the paper-sheet insertion port 22 of the paper-sheet handling unit 20, the bar-code tickets inserted through the paper-sheet insertion port 22 will be fed out to the paper-sheet transportation portion 23, one by one, and then transported by the paper-sheet transportation portion 23, one by one. Thereafter, each transported bar-code ticket will be discriminated by the paper-sheet discrimination portion 24. Specifically, the paper-sheet discrimination portion 24 detects each paper-sheet transported into this paper-sheet discrimination portion 24 as bar-code ticket, and then reads the bar-code information attached to the bar-code ticket. Thereafter, this bar-code information will be sent to the control unit 60 from the paper-sheet discrimination portion 24.

Then, the control unit 60 performs a check over the read information about the bar code by communicating with the casino host controller 72. As a result, when the bar-code information of the bar-code ticket read by the paper-sheet discrimination portion 24 can be correctly verified by the information about the bar-code ticket stored in the casino host controller 72, information about the amount of money corresponding to the checked bar-code ticket will be transmitted to the control unit 60 from the casino host controller 72. Thereafter, the paper-sheet transportation portion 23 transports the bar-code ticket to the bar-code ticket storage part 26*e*, so as to allow this bar-code ticket to be stored in the bar-code ticket storage part 26*e*. At the same time, the control unit 60 drives the banknote handling unit 50 to disburse the banknotes of an amount of money corresponding to the information about the bar-code ticket transmitted from the casino host controller 72, into the banknote disbursement port 52 of the banknote handling unit 50. In this way, the banknotes equivalent to the bar-code ticket (or tickets) inserted into the paper-sheet insertion port 22 will be disbursed from the banknote disbursement port 52, thus completing the cashing of the bar-code ticket (or tickets) in the automatic dealing machine 10.

On the other hand, when the bar-code information about the bar-code ticket read by the paper-sheet discrimination portion 24 is not verified by the information about the bar-code tickets stored in the casino host controller 72, upon the check, by the control unit 60, over the read information about the bar-code, by communicating with the casino host controller 72, such a bar-code ticket will be sent to a reject portion (not shown) provided in the paper-sheet handling unit 20, and returned to the customer.

<Obtainment of the Image of the Bar-Code Ticket>

Next, an operation related to the obtainment of the image of each bar-code ticket will be described.

In the operation related to the cashing of the bar-code ticket as described above, when the bar-code information about the bar-code ticket is read by the paper-sheet discrimination portion 24, the image of the bar-code ticket is also obtained by the paper-sheet discrimination portion 24. This information about the image of the bar-code ticket obtained by the paper-sheet discrimination portion 24 is then sent to and stored in the control unit 60. Thereafter, the information about the image of the bar-code ticket stored in the control unit 60 will be transmitted to the casino host controller 72 via the communication portion 64. In this manner, the obtainment of the image of each bar-code ticket in the automatic dealing machine 10 is completed.

<Cashing of the Checks>

Next, an operation related to the cashing of the checks will be described.

When a customer puts one or more checks in the paper-sheet insertion port 22 of the paper-sheet handling unit 20, the checks inserted into the paper-sheet insertion port 22 will be fed out to the paper-sheet transportation portion 23, one by one, and then transported by the paper-sheet transportation portion 23, one by one. Thereafter, the so-transported checks will be discriminated by the paper-sheet discrimination portion 24. Specifically, the paper-sheet discrimination portion 24 detects each paper-sheet transported into this paper-sheet discrimination portion 24 as check, and then reads the data on this check. Thereafter, the data of this check will be sent to the control unit 60 from the paper-sheet discrimination portion 24.

Then, the control unit 60 performs a check over the read data of the check by communicating with the bank host controller 74, and receives a result of the check from the bank host controller 74. As a result, when the data on the check read by the paper-sheet discrimination portion 24 can be correctly verified by the information about the check stored in the bank host controller 74, the paper-sheet transportation portion 23 transports this check to the check storage part 26*d*, so as to allow the check to be stored in the check storage part 26*d*. At the same time, the control unit 60 drives the banknote handling unit 50 to disburse the banknotes of an amount of money corresponding to the information about the check transmitted from the bank host controller 74, into the banknote disbursement port 52 of the banknote handling unit 50. In this way, the banknote equivalent to the check (or checks) inserted into the paper-sheet insertion port 22 will be disbursed from the banknote disbursement port 52, thus completing the cashing of the check or checks in the automatic dealing machine 10.

On the other hand, when the data of the check read by the paper-sheet discrimination portion 24 is not verified by the information about the check stored in the bank host controller 74, upon the check, by the control unit 60, over the read information about the data of the check, by communicating with the bank host controller 74, such a check will be sent to the reject portion (not shown) provided in the paper-sheet handling unit 20, and returned to the customer.

<Obtainment of the Image of Each Check>

Next, an operation related to the obtainment of the image of each check will be described.

In the operation related to the cashing of the check as described above, when the data of the check is read by the paper-sheet discrimination portion 24, the image of the check is also obtained by the paper-sheet discrimination portion 24. This information about the image of the check obtained by the paper-sheet discrimination portion 24 is then sent to and stored in the control unit 60. Thereafter, the information about the image of the check stored in the control unit 60 will be transmitted to the bank host controller 74 via the communication portion 64. In this manner, the obtainment of the image of each check in the automatic dealing machine 10 is completed.

<Cashing of the Chips>

Next, an operation related to the cashing of the chips will be described.

When a customer puts one or more chips in the chip insertion port 42 of the chip handling unit 40, the chips inserted into the chip insertion port 42 will be fed to the chip transportation portion 43, one by one, and then transported by the chip transportation portion 43, one by one. Thereafter, the kind of each transported chip will be determined by the chip determination portion 44. Subsequently, information about the determination of the chip obtained by the chip determination portion 44 will be sent to the chip calculation portion 45, and then the number of the chips, for each kind, and total amount of money will be calculated by the chip calculation portion 45. In this way, information of calculation by the chip calculation portion 45 is sent to the control unit 60.

Each chip which can be determined by the chip determination portion 44 is then transported to and stored in the chip storage portion 46 due to the chip transportation portion 43. At the same time, the control unit 60 drives the banknote handling unit 50 to disburse the banknotes of an amount of money corresponding to the total amount of money of the one or more chips calculated by the chip calculation portion 45, into the banknote disbursement port 52 of the banknote handling unit 50. As used herein, "the banknotes of an amount of money corresponding to the total amount of money of the chips" means the banknotes of the same amount of money as the total amount of money of the chips, or otherwise means the banknotes of an amount of money corresponding to an amount of money that is the maximum within a range smaller than the total amount of money of the chips in the case in which the total amount of money of such banknotes is not completely coincident with the total amount of money of the chips. In this way, the banknotes equivalent to the chip (or chips) inserted into the chip insertion port 42 will be disbursed from the banknote disbursement port 52, thus completing the cashing of the chip or chips in the automatic dealing machine 10.

On the other hand, each chip which cannot be determined by the chip determination portion 44 will be sent to a reject portion (not shown) provided in the chip handling unit 40, and returned to the customer.

<Exchange>

Next, an operation related to the exchange of the banknotes and coins will be described.

When a customer puts the banknotes in the paper-sheet insertion port 22 of the paper-sheet handling unit 20 and/or puts the coins in the coin insertion port 32 of the coin handling unit 30, such banknotes and/or coins will be discriminated by the paper-sheet discrimination portion 24 and/or coin discrimination portion 34. Specifically, the paper-sheet discrimination portion 24 and/or coin discrimination portion 34 discriminates the banknotes and/or coins inserted through the paper-sheet insertion port 22 and/or coin insertion port 32, about the denomination, authenticity, fitness and the like thereof. Then, information about a result of the discrimination for the banknotes and/or coins by the paper-sheet discrimination portion 24 and/or coin discrimination portion 34 will be sent to the control unit 60.

Each banknote and/or coin discriminated as a normal one by the paper-sheet discrimination portion 24 and/or coin discrimination portion 34 will be sent to each banknote storage part 26a, 26b, 26c of the paper-sheet storage portion 26 and/or coin storage portion 36. On the other hand, each banknote and/or coin which cannot be discriminated and each banknote and/or coin which is discriminated as an abnormal one, by the paper-sheet discrimination portion 24 and/or coin discrimination portion 34, will be sent to each reject portion (not shown) provided in the paper-sheet handling unit 20 and/or coin handling unit 30, and returned to the customer.

Thereafter, the control unit 60 drives the banknote handling unit 50 to disburse the banknotes of an amount of money corresponding to total amount of money of the banknotes and/or coins in the result of discrimination by the paper-sheet discrimination portion 24 and/or coin discrimination portion 34, into the banknote disbursement port 52 of the banknote handling unit 50. In the operation related to the exchange as described above, when the customer puts the banknotes in the paper-sheet insertion port 22, the banknotes different in the denomination from those inserted through the paper-sheet insertion port 22 will be disbursed from the banknote disbursement port 52. In this manner, the exchange of the banknotes and/or coins in the automatic dealing machine 10 is completed.

<Disbursement of Money on Deposit>

Next, an operation related to disbursement of money on deposit will be described.

When a customer gives a command for the disbursement of money on deposit to the control unit 60 via the display and operation portion 62, the communication portion 64 connected with the control unit 60 will communicate with the bank host controller 74. Specifically, when the customer designates customer information and amount of money of disbursement via the display and operation portion 62, deposit data of the customer stored in the bank host controller 74 can be referred to via the communication portion 64, so that whether or not the amount of money on deposit of the customer in the deposit data is greater than the amount of money of disbursement designated via the display and operation portion 62 can be determined.

As a result, in the case in which the amount of money on deposit of the customer in the deposit data is greater than the amount of money of disbursement designated via the display and operation portion 62, the control unit 60 drives the banknote handling unit 50 to disburse the banknotes of an amount of money corresponding to the amount of money of disbursement designated via the display and operation portion 62, into the banknote disbursement port 52 of the banknote handling unit 50. At the same time, in the bank host controller 74, the amount of money of disbursement is subtracted from the amount of money on deposit in the customer's deposit data.

On the other hand, in the case in which the amount of money on deposit in the customer's deposit data is smaller than the amount of money of disbursement designated via the display and operation portion 62, shortage of the amount of money on deposit of the customer is displayed on the display and operation portion 62, and the disbursement of banknotes from the banknote disbursement port 52 of the banknote handling unit 50 will not be performed. In this manner, the disbursement of money on deposit via the automatic dealing machine 10 is completed.

<Deposit of Money>

Next, an operation related to a deposit of money will be described.

When a customer gives a command for depositing money to the control unit 60 and puts the banknotes in the paper-sheet insertion port 22 of the paper-sheet handling unit 20 and/or puts the coins in the coin insertion port 32 of the coin handling unit 30, such banknotes and/or coins will be discriminated by the paper-sheet discrimination portion 24 and/or coin discrimination portion 34. Specifically, the paper-sheet discrimination portion 24 and/or coin discrimination portion 34 discriminates the banknotes and/or coins inserted through the paper-sheet insertion port 22 and/or coin insertion port 32, about the denomination, authenticity, fitness and the like thereof. Thereafter, information about a result of the discrimination for the banknotes and/or coins by the paper-sheet discrimination portion 24 and/or coin discrimination portion 34 will be sent to the control unit 60.

Each banknote and/or coin discriminated as a normal one by the paper-sheet discrimination portion 24 and/or coin discrimination portion 34 will be sent to each banknote storage part 26a, 26b, 26c of the paper-sheet storage portion 26 and/or coin storage portion 36. On the other hand, each banknote and/or coin which cannot be discriminated and each banknote and/or coin which is discriminated as an abnormal one, by the paper-sheet discrimination portion 24 and/or coin discrimination portion 34, will be sent to each reject portion (not shown) provided in the paper-sheet handling unit 20 and/or coin handling unit 30, and returned to the customer.

Thereafter, the communication portion 64 connected with the control unit 60 will communicate with the bank host controller 74. Specifically, the control unit 60 sends customer information as well as information concerning the amount of money that is deposited, i.e., the total amount of money of the banknotes and/or coins in the discrimination result by the paper-sheet discrimination portion 24 and/or coin discrimination portion 34, to the bank host controller 74. Then, in the bank host controller 74, the amount of money that is deposited is added to the amount of money on deposit in the customer's deposit data. In this manner, the deposit of money via the automatic dealing machine 10 is completed.

It should be appreciated that in the operation related to the deposit of money, in addition to the banknotes and/or coins as described above, information concerning the amount of money that is deposited, i.e., the total amount of money of chips, bar-code tickets and/or checks sent to the paper-sheet storage portion 26 and/or chip storage portion 46 from the exterior of the casing 12 may also be sent to the bank host controller 74 from the control unit 60. Then, in the bank host controller 74, the amount of money that is deposited, as chips, bar-code tickets and/or checks, may be added to the amount of money on deposit in the customer's deposit data.

As described above, according to the automatic dealing machine 10 and automatic dealing system 70 provided with the automatic dealing machine 10 of this embodiment, the chip handling unit 40 located in the casing 12 and adapted for handling the chips includes the chip insertion port 42 through which the chips can be inserted into the chip handling unit 40 from the exterior of the casing 12, chip determination portion 44 adapted for determining the kind of each chip inserted into the chip insertion port 42 and chip calculation portion 45 adapted for calculating the number of the chips, for each kind, determined by the chip determination portion 44 and total amount of money. Thus, when one or more chips are inserted through the chip insertion port 42 of the chip handling unit 40, the banknotes of an amount of money corresponding to the total amount of money of the one or more chips calculated by the chip calculation portion 45 of the chip handling unit 40 will be disbursed into the banknote disbursement port 52 of the banknote handling unit 50. In this manner, determination of each chip inserted through the chip insertion port 42 can be automatically performed in the chip handling unit 40. Therefore, the time and labor required for determining each chip by hand can be eliminated, as well as the banknotes of the amount of money corresponding to the total amount of money of the determined chips can be automatically disbursed into the banknote disbursement port 52 of the banknote handling unit 50.

Additionally, according to the automatic dealing machine 10 and automatic dealing system 70 provided with the automatic dealing machine 10 of this embodiment, all or part of handling, such as the exchange and/or cashing of the cash, such as the banknotes and coins, bar-code tickets, checks, chips and the like, obtainment of the image of each bar-code ticket and/or check, or deposit of money and/or disbursement of money on deposit, can be performed by a single automatic dealing machine.

It is noted that the automatic dealing machine 10 and automatic dealing system 70 according to the present invention are not limited to the aspects described above, and various modifications can be made thereto without departing from the spirit and scope of this invention.

For instance, the chip determination portion 44 adapted for determining the kind of each chip is not limited to the construction as shown in FIGS. 4 and 5. As an alternative of this chip determination portion, any suitable means adapted for determining each chip, based on information about the interior of the chip, e.g., an IC tag and/or certain chip material provided or incorporated in the chip, can be used.

In the automatic dealing machine 10, a coin disbursement handling unit adapted for disbursing coins stored in the casing 12 may be additionally provided. In this case, upon the cashing of the bar-code tickets, cashing of the checks, cashing of the chips, exchange of the cash and disbursement of money on deposit as described above, the coins may be disbursed from a coin disbursement port of the coin disbursement handling unit, rather than disbursing the banknotes from the banknote disbursement port 52 of the banknote handling unit 50. Alternatively, the coins may be disbursed from the coin disbursement port of the coin disbursement handling unit, while the banknotes are disbursed from the banknote disbursement port 52 of the banknote handling unit 50. More specifically, the control unit 60 may disburse coins from the coin disbursement port of the coin disbursement handling unit, as the remaining amount of money left undisbursed upon disbursement in accordance with a designation of a customer, or as an amount of money that cannot be disbursed with the banknotes.

Alternatively, in the automatic dealing machine 10, a chip disbursement handling unit adapted for disbursing the chips stored in the casing 12 to the exterior thereof may be additionally provided. In this case, when a customer puts the banknotes and/or coins in the paper-sheet insertion port 22 and/or coin insertion port 32, the chips equivalent to such inserted banknotes and/or coins can be disbursed from a chip disbursement port provided in the chip disbursement handling unit.

Alternatively, in the automatic dealing machine 10, a bar-code ticket disbursement handling unit adapted for disbursing the bar-code tickets to the exterior of the casing 12 may be additionally provided. For instance, this bar-code ticket disbursement handling unit has a printer, such that the bar-code tickets can be respectively printed by the printer each time the bar-code tickets are disbursed to the exterior of the casing 12. In this case, when a customer puts the banknotes and/or coins in the paper-sheet insertion port 22 and/or coin insertion port 32, the bar-code tickets equivalent to such inserted banknotes and/or coins can be disbursed from a bar-code ticket disbursement port provided in the bar-code ticket disbursement unit.

Rather than providing the paper-sheet handling unit 20 and banknote handling unit 50 in the automatic dealing machine 10, a recycling-type banknote handling unit adapted for recycling the banknotes may be provided in the automatic dealing machine 10. This recycling-type banknote handling unit is configured to store therein the banknotes fed into the recycling-type banknote handling unit from the exterior of the casing 12 of the automatic dealing machine 10 as well as configured to disburse the banknotes inserted from the exterior of the casing 12 and stored in this unit to the exterior of the casing 12. Also by using such a recycling-type banknote handling unit, the handling, such as cashing of the bar-code tickets, obtainment of the image of each bar-code ticket, cashing of the checks, obtainment of the image of each check, cashing of the chips, exchange of the cash, deposit of money and/or disbursement of money on deposit as described above, can be performed.

The control unit may use a storage medium, such as a hard disk, CD-ROM or the like, which can be controlled by a customer, in order to store therein the remaining amount of money upon the disbursement in accordance with the designation of a customer or amount of money that cannot be disbursed with banknotes.

Figure 6:
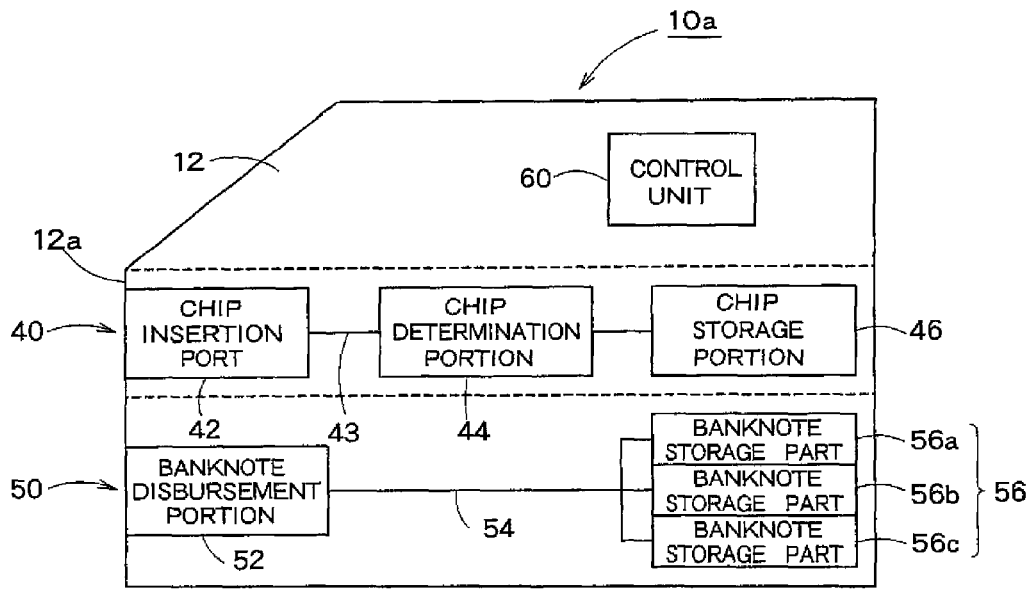
FIG. 6 is a configuration diagram showing schematic construction of another automatic dealing machine according to the present invention.

The automatic dealing machine according to the present invention is not limited to an aspect that includes the paper-sheet handling unit 20, coin handling unit 30, chip handling unit 40 and banknote handling unit 50. FIG. 6 is a configuration diagram showing schematic construction of another automatic dealing machine according to the present invention. As shown in FIG. 6, another automatic dealing machine 10a of this invention may include only the chip handling unit 40 and banknote handling unit 50. Also in the case of such an automatic dealing machine 10a as shown in FIG. 6, as with the automatic dealing machine 10 as shown in FIG. 2, when one or more chips are inserted through the chip insertion port 42 of the chip handling unit 40, the banknotes of an amount of money corresponding to the total amount of money of the one or more chips calculated by the chip calculation portion 45 of the chip handling unit 40 will be disbursed into the banknote disbursement port 52 of the banknote handling unit 50. In this manner, also in the case of the automatic dealing machine 10*a* as shown in FIG. 6, the determination of the chips inserted through the chip insertion port 42 can be automatically performed. Therefore, the time and labor required for the determination of the chips by hand can be eliminated. Besides, the banknotes of the amount of money corresponding to the total amount of money of the determined chips can be automatically disbursed into the banknote disbursement port 52 of the banknote handling unit 50.

Figure 7:
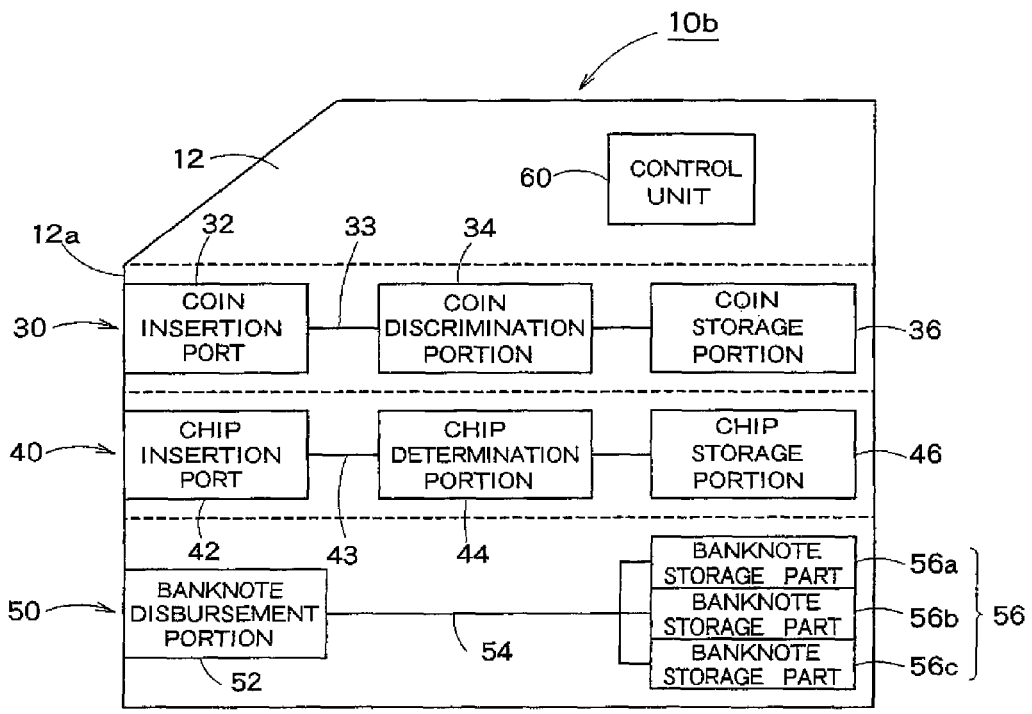
FIG. 7 is a configuration diagram showing schematic construction of still another automatic dealing machine according to the present invention.

Alternatively, as shown in FIG. 7, still another automatic dealing machine 10*b* according to the present invention may have construction in which the automatic dealing machine 10*a* as shown in FIG. 6 further includes the coin handling unit 30. Namely, the automatic dealing machine 10*b* shown in FIG. 7 includes the coin handling unit 30, chip handling unit 40 and banknote handling unit 50. With such an automatic dealing machine 10*b*, the exchange and/or deposit of money can be performed, in addition to the cashing of the chips.

Figure 8:
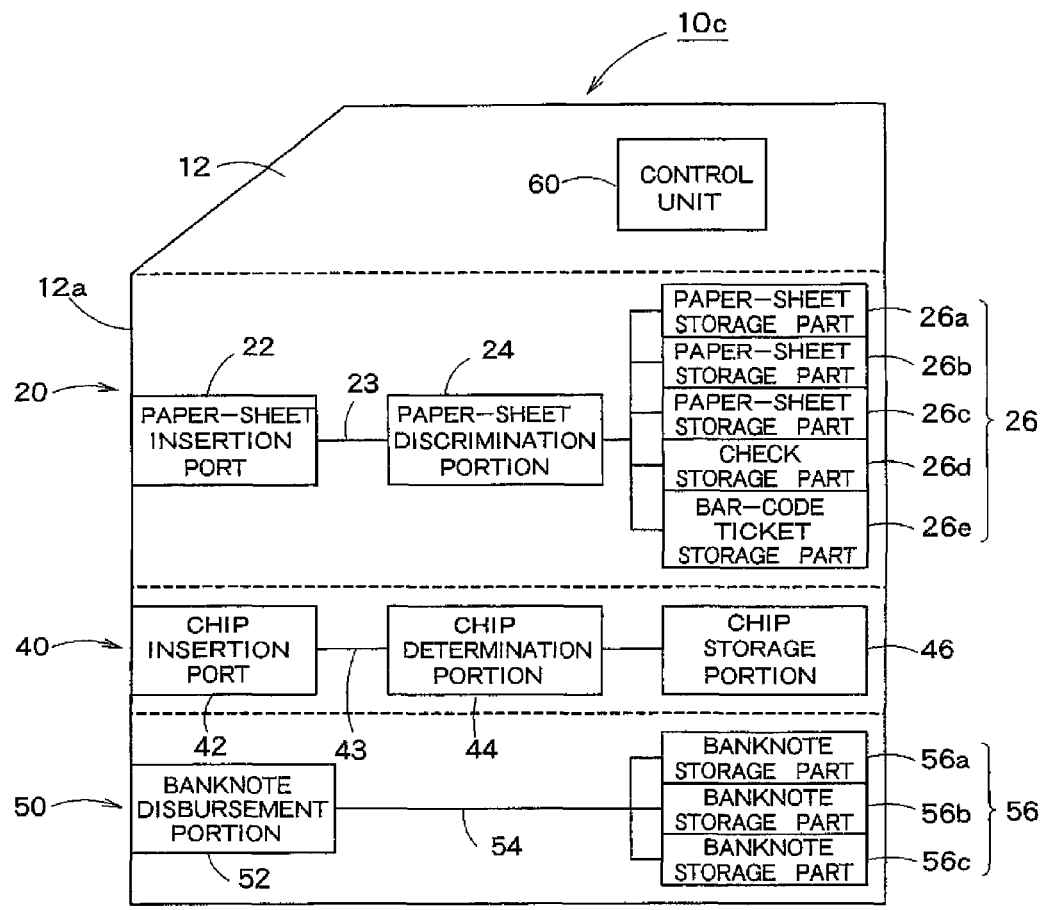
FIG. 8 is a configuration diagram showing schematic construction of yet still another automatic dealing machine according to the present invention.

Alternatively, as shown in FIG. 8, a yet still another automatic dealing machine 10*c* according to the present invention may have such construction that the automatic dealing machine 10*a* as shown in FIG. 6 further includes the paper-sheet handling unit 20. Namely, the automatic dealing machine 10*c* shown in FIG. 8 includes the paper-sheet handling unit 20, chip handling unit 40 and banknote handling unit 50. With such an automatic dealing machine 10*c*, the cashing of the bar-code tickets, obtainment of the image of each bar-code ticket, cashing of the checks, obtainment of the image of each check, and exchange and/or deposit of money can be performed, in addition to the cashing of the chips.

What is claimed is:

1. An automatic dealing machine comprising:
   a discrimination portion adapted for discriminating bar-code tickets by reading bar-code information from the bar-code tickets;
   a chip handling unit adapted for handling chips, the chip handling unit having a chip determination portion configured to determine the kind of each chip based on a color of the chip or a design of the chip in an image data; and
   a banknote handling unit, which is configured to at least perform disbursement of banknotes, wherein the automatic dealing machine can deposit and disburse the banknotes, wherein the discrimination portion is adapted for discriminating the banknotes, and wherein the banknotes of the amount of money corresponding to the total amount of money of the deposited banknotes in a result of discrimination by the discrimination portion, while different in the denomination, can be disbursed when the banknotes are inserted; and
   an operation portion configured to be operated by a customer; wherein the amount of money that is deposited can be calculated by adding the amount of money of the bar-code tickets and the amount of money of the chips,
   wherein the automatic dealing machine can communicate with a bank host controller, and wherein when the customer gives a command for a disbursement of money on deposit via the operation portion, it is determined by the bank host controller whether an amount of money on deposit for the customer is greater than an amount of money designated for disbursement.

2. The automatic dealing machine according to claim 1, wherein a part of or all of the amount of money that is deposited, as the bar-code tickets or the chips, is added to the amount of money on deposit in a customer's deposit data.

3. The automatic dealing machine according to claim 1, further comprising a disbursement handling unit adapted for disbursing the bar-code tickets or the chips, wherein the banknotes or coins can be deposited in the automatic dealing machine, and wherein the bar-code tickets or the chips, which are equivalent to deposited banknotes or coins, can be disbursed.

4. The automatic dealing machine according to claim 1, further comprising a paper-sheet handling unit, which can handle both the banknotes and the bar-code tickets.

5. The automatic dealing machine according to claim 1, further comprising: a paper-sheet handling unit, which deposits and disburses the banknotes, wherein the paper-sheet handling unit uses the banknotes, which are deposited in the paper-sheet handling unit, for disbursing.

6. An automatic dealing machine comprising:
   a discrimination portion adapted for discriminating bar-code tickets by reading bar-code information of the bar-code tickets;
   a chip handling unit adapted for handling chips, the chip handling unit having a chip determination portion configured to determine the kind of each chip, based on a color of the chip or a design of the chip in an image data;
   a banknote handling unit, which is configured to at least perform disbursement of banknotes; and an operation portion configured to be operated by a customer;
   wherein the amount of money that is deposited can be calculated by adding the amount of money of the bar-code tickets and the amount of money of the chips,
   wherein the automatic dealing machine can communicate with a bank host controller, and
   wherein a part of or all of the amount of money of the chips is added to the amount of money on deposit for the customer by the bank host controller when the kind of the one or more chips is determined by the chip determination portion, and
   wherein when the customer gives a command for a disbursement of money on deposit via the operation portion, it is determined by the bank host controller whether an amount of money on deposit for the customer is greater than an amount of money designated for disbursement.

\* \* \* \* \*